United States Patent
Mallett

[15] 3,677,428
[45] July 18, 1972

[54] BALE LIFTER

[72] Inventor: Wallace L. E. Mallett, Union Road, R.R. 3, Charlottetown, Prince Edward Island, Canada

[22] Filed: Oct. 20, 1970

[21] Appl. No.: 82,454

[52] U.S. Cl. ..........................214/147 G, 294/88, 294/104
[51] Int. Cl. ..........................................................B66c 1/44
[58] Field of Search ..........................214/147 G, 147 R, 653; 294/106, 88, DIG. 2, 104

[56] References Cited

UNITED STATES PATENTS

| | | | |
|---|---|---|---|
| 2,693,285 | 11/1954 | Buschbom | 214/147 G X |
| 2,979,216 | 4/1961 | Edwards | 294/104 X |
| 2,297,291 | 9/1942 | Danielson | 294/DIG. 2 |
| 3,362,545 | 1/1968 | Rowe | 294/106 X |

Primary Examiner—Gerald W. Forlenza
Assistant Examiner—George F. Abraham
Attorney—Ralph J. Broderick

[57] ABSTRACT

This invention is an attachment and improvement to be used in combination with the conventional hydraulically operated front-end loaders commonly used attached to farm-tractors, and provides new means for handling, lifting and moving bales of hay, cotton, or any other produce or material capable of being handled in bale form, and means for handling relatively larger numbers of bales than any previous art. It is therefore a labor and time saver and of general economic benefit. It consists of a combination of an oblong rectangular metal plate attached by removable means to the arms of the front-end loader, having two metal arms disposed over the metal plate and attached by means thereto, and extending over and behind the metal plate, where a hydraulic cylinder; connected by conventional means to the hydraulic pump system on the tractor; is disposed between and attached to the arms, which also extend over and in front of the metal plate, to, through and in front of, an oblong open-sided box-like receptacle, which is also attached by removable means to the arms of the front-end loader. The box-like receptacle protects and supports the two arms of the invention and holds one of them by means in various stationary positions, allowing the other to move within the box-like receptacle, when actuated by the hydraulic cylinder. An expansion spring holds the arms of the invention apart. The said arms each have a corrugated metal plate, disposed and adapted to be attached by removable means to the inner side of their ends. The combination is attached to the front-end loader arms. The operator on a tractor moves the tractor toward the bales of produce or material to be moved; positions same between the metal plates attached to the ends of the arms of the invention; actuates the hydraulic cylinder from the tractor, which brings the movable arm against the bales tightly enough to grasp and hold them while they are being lifted; the operator then actuates the front-end loader from the tractor, lifting the bales, moves same over a vehicle or over a pile or storage place; releases the movable arm, which drops the bales where they are required.

5 Claims, 5 Drawing Figures

Patented July 18, 1972 3,677,428

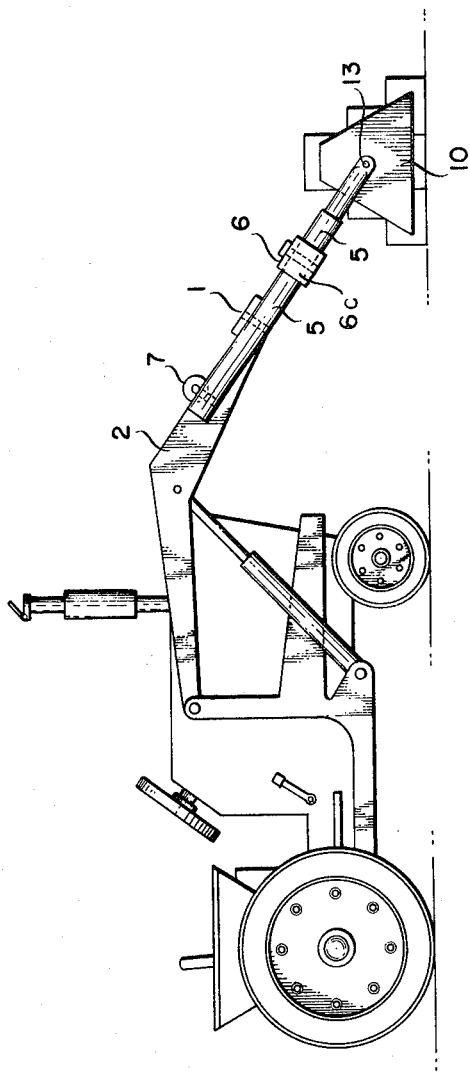

BALE LIFTER

My invention is a mechanical device, combination and attachment and is believed to be a new method of handling bales of produce, such as hay, cotton, or any other produce or material capable of being handled in bale form, and provides means for grasping, holding and lifting a number of bales at one time and placing them on a truck or other vehicle for transportation.

The invention is used in conjunction with, and as an improvement and attachment to, the hydraulic front-end loaders widely used in conjunction with farm-tractors, for loading and moving materials.

This invention is an improvement on the previously known art in that it is believed to be completely novel.

The previously known art provided means for moving only one bale at a time and that, in great part, by mostly manual means combined with a hay-baler, throwing single bales at a time.

The objective of my invention is to provide means for moving a larger number of bales at one time and is therefore a labor saver; a time-saver; and of general economic benefit.

The mechanical parts and the mode of use and operation of this invention are illustrated in the drawings filed herewith, in which the same numbers are used to illustrate the same parts:

In the drawings:

FIG. 5 is a lateral view of the invention attached to a front-end loader on a tractor.

Figure 1:
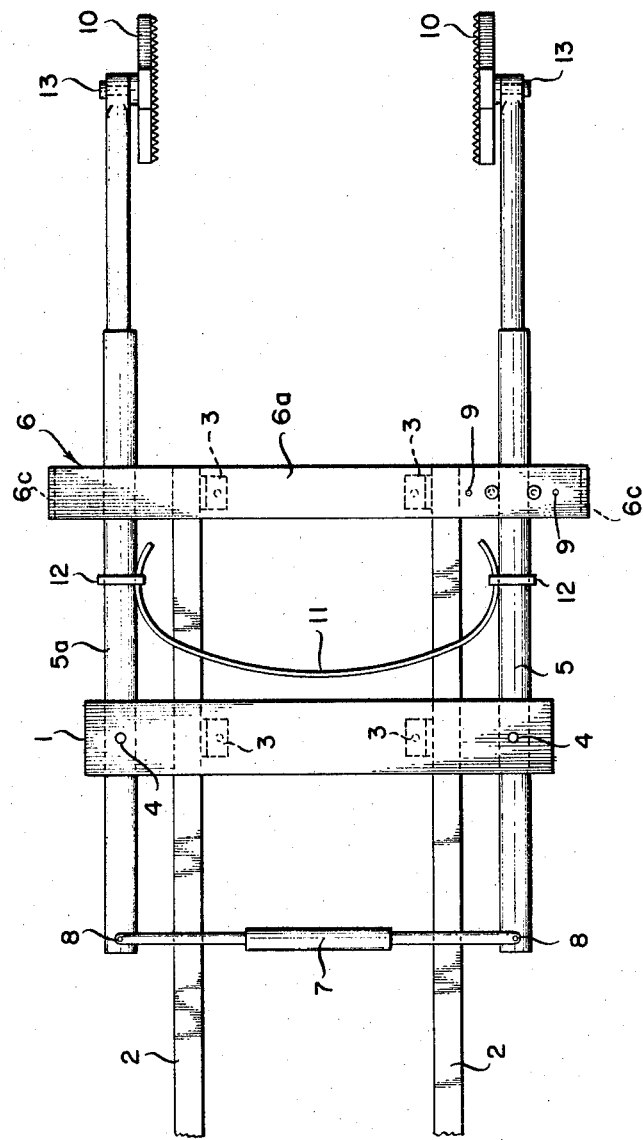
FIG. 1 is a plan view of the combined invention.

An oblong rectangular metal plate 1, is disposed and adapted to be removably attached by clamps, U-Bolts or other appropriate known means 3, to the arms 2, FIGS. 1 and 5, of an hydraulically operated front-end loader, which is conventionally attached to, and operated from, a farm-tractor, FIG. 5.

Two metal bale-lifter arms 5, 5a, extend over and behind and over and in front of, the plate 1, and are attached to the plate 1 by hinge-bolts 4. One of the bale-lifter arms 5, is held in various stationary positions by bolts extending through bolt holes 9, through one of the ends of the box 6, FIG. 4, and the other bale-lifter arm 5a, is movable within the box 6, as hereinafter described.

Figure 2:
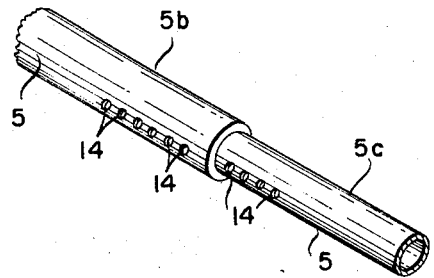
FIGS. 2 and 3 are detail views of part modifications.
Figure 3:
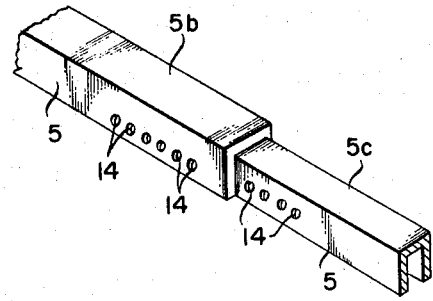

The bale-lifter arms 5, 5a, may be of unitary construction, in tubular form or in U-shaped form, and they may be made adjustable as to length, if desired, as shown in FIGS. 2 and 3.

This is accomplished by fabricating the bale-lifter arms 5, 5a, in two or more sections of metal tubing, FIG. 2, or U-shaped metal, FIG. 3, of different diameters, 5b, 5c, FIGS. 2 and 3, the diameter of one section 5c, being sufficiently smaller than that of the other section 5b, to permit telescoping of one section 5c into the other 5b. The said sections being provided with bolt holes 14, FIGS. 2 and 3, whereby the sections may be bolted and held stationary in the required positions and lengths.

The bale-lifter arms 5, 5a, FIG. 1, extend over, out from and behind plate 1, a requisite distance in order to enable an hydraulic cylinder 7 to be installed between them. The hydraulic cylinder 7, is disposed behind plate 1 and between the bale-lifter arms 5, 5a, and is attached to and between the bale-lifter arms 5, 5a, behind plate 1, by bolt, pin, or other known means 8.

The hydraulic cylinder 7 is connected by conventional means to the hydraulic pump and to controls on the farm-tractor, whereby it is controlled and operated by the operator of the tractor and actuates the movements of the movable bale-lifter arm 5a.

The hydraulic cylinder 7, may be a single-action hydraulic cylinder or a double-action hydraulic cylinder.

In case a single-action hydraulic cylinder 7 is used, an expansion spring 11, disposed and adapted to hold open the bale-lifter arms 5, 5a, is attached to and between the bale-lifter arms 5, 5a, in front of the plate 1 and behind the box 6, by clamp, bolt, pin or other removable known means 12.

The expansion spring 11, holds the bale-lifter arms 5, 5a, open so that the bales to be lifted can be positioned between the bale-holders 10, preparatory to lifting them, FIG. 5.

Figure 4:
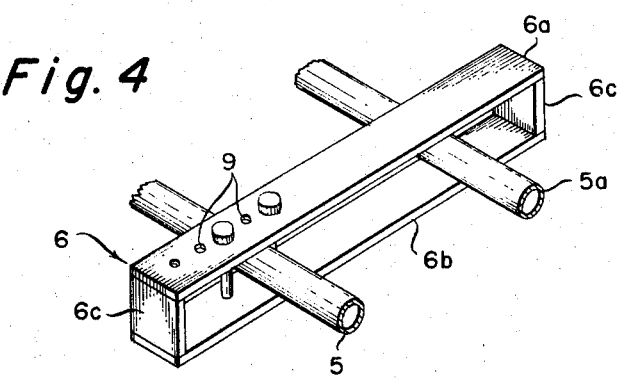
FIG. 4 is a detail perspective view of another part.

The bale-lifter arms 5, 5a, extend over, out from and in front of plate 1, between and through two oblong rectangular metal plates 6a, 6b, connected at their ends by two square metal plates 6c, welded to the plates 6a, 6b, so that the plates 6a, 6b, 6c, FIG. 4, form an open-sided oblong box-like receptacle, hereinafter collectively referred to as the box 6, FIGS. 1, 4 and 5.

The box 6 is attached to the arms 2, of the front-end leader by similar but additional bolt, pin or other removable known means 3, as the plate 1 is attached to the arms 2.

The purpose of the box 6, is to strengthen the bale-lifter arms 5, 5a, and to prevent the bale-lifter arms 5, 5a, from breaking or bending, due to the weight of the bales during lifting and lowering of the bales; and to hold the movable bale-lifter arms 5, 5a, in position.

The bale-lifter arms 5, 5a, project through the box 6, to the requisite length, and have metal plates called bale-holders 10, attached to the inner sides of each of their ends, FIGS. 1 and 5.

The bale-holders 10, are attached to the inner sides of the ends of the bale-lifter arms 5, 5a, by bolts, pins or other removable known means 13, FIG. 1, and are corrugated 10, FIG. 1, or spiked so as to hold the bales tightly without slipping.

As hay is ordinarily stooked or piled in the fields, after baling, in roughly triangular-shaped stooks, it is believed that it would be more efficient to have the bale holders 10, fabricated in a triangular shape, FIG. 5, for hay-bale lifting and moving purposes, as more bales of hay could be lifted in one operation, or at one time, by triangular shaped bale holders 10, FIG. 5.

However, the bale-holders 10, could be made in square, oblong, or any desired shape to suit any particular lifting job, as the bale-holders 10, are removably attached to the bale-lifter arms 5, 5a, as described.

The method of use and operation of the invention is as follows:

The plate 1 and the box 6 of the combination are attached as described, to the arms 2, of an hydraulically operated front-end loader attached to a farm-tractor, FIGS. 1 and 5.

The hoses actuating hydraulic cylinder 7, are attached to the hydraulic pumping system of the tractor and to controls thereon so as the operator of the tractor can control the action of the hydraulic cylinder 7, which moves the movable bale-lifter arm 5a. The operator also controls the upward and downward action of the front-end loader arms 2, to which the above described invention is attached, by the conventional hydraulic means.

The operator approaches a stook or pile of bales of hay, or other produce or material to be moved, lowers the front end loader arms 2, with this invention attached thereto and positions his tractor so that the bales to be moved are between the bale-holders 10, FIG. 5.

In case of the use of a single action hydraulic cylinder 7, used with expansion spring 11, the operator positions the bales to be lifted between the bale-holders 10, attached to the bale-lifter arms 5, 5a.

By actuation of hydraulic cylinder 7, he brings movable bale-lifter arm 5a, with bale-holder 10 attached, firmly against the stook or stack of bales to be lifted, tightly enough to hold the bales between the bale-holders 10, so they can be lifted.

The operator then raises the loader arms 2 by the usual means, which lift this invention holding the bales, the operator then deposits the bales in a truck or other vehicle, by releasing movable bale-lifter arm 5a, or if the distance is short, may drive the tractor to the barn and deposit the bales directly therein, in the same manner.

A double-action hydraulic cylinder may be used, instead of the single-action hydraulic cylinder 7 and the expansion spring 11, in which case the double-action cylinder may be used either in the same position as the single-action cylinder 7, or it may be positioned between and attached by means to the bale-lifter arms 5, 5a, in front of the plate 1 and behind the box 6, in relatively the same position as and in place of the expansion spring 11, in all other respects the mode of use and operation is the same.

The above specification and disclosure embodies my invention.

My invention may be embodied in forms other than as set out in my drawings and specification and I therefore claim as mine all modifications of my device which may fairly fall within the scope of my appended claims.

Having described my invention, I hereby particularly point out and distinctly claim and desire to secure by Letters Patent the following parts, improvements, articles and combinations as my invention and discovery.

1. A mechanical device disposed and adapted to be used as an improvement and attachment to the conventional hydraulically operated front-end loader used with, and as an attachment to, the conventional farm-tractor, consisting of a combination of an oblong rectangular metal plate having two unitary metal arms each pivotally connected at a midpoint to the metal plate, a single-action hydraulic cylinder disposed between and attached to the metal arms in back of the oblong rectangular metal plate, a metal oblong rectangular open-sided box-like receptacle secured in front of said plate and through which project the unitary metal arms, one of the unitary metal arms capable of being held in various stationary positions by bolts through bolt holes provided through the respective end of the oblong rectangular open-sided box-like receptacle, the other unitary metal arm actuated within the oblong rectangular box-like receptacle by the single-action hydraulic cylinder, an expansion spring disposed between and attached to the unitary metal arms in front of the oblong rectangular metal plate and behind the oblong rectangular open-sided box-like receptacle, two triangular corrugated metal plates, one removably attached to each of the inner sides of the ends of the unitary metal arms, the oblong rectangular metal plate and the oblong rectangular open-sided box-like receptacle each being attachable by removable means to the arms of an hydraulically operated front-end loader attached to and operated from a farm-tractor, the single-action hydraulic cylinder being removably attachable by conventional means to and actuated by, the hydraulic pump system of the farm tractor.

2. A combination consisting of an oblong rectangular metal plate, removably attachable to the arms of a conventional hydraulic front-end loader attached to and used with a conventional farm-tractor, having two metal arms each pivotally attached at a midpoint to the oblong rectangular metal plate, and extending in front of the metal plate and between two other oblong rectangular metal plates held apart and joined at their ends by two square relatively smaller plates collectively forming an open-sided, oblong rectangular box-like receptacle removably attached to the arms of a front-end loader and having bolt holes through one end thereof for the insertion of bolts, whereby one of the metal arms is held therein in various stationary positions, a conventional single-action hydraulic cylinder attached to the two metal arms behind the first mentioned oblong rectangular plate and operated by conventional means from the hydraulic pump of the tractor, whereby the other metal arm is actuated within the box-like receptacle, a triangular corrugated metal plate attached to the inner side of the front end of each metal arm, an expansion spring disposed between the metal arms and removably attached thereto.

3. A mechanical device as described in claim 2, in which the metal arms are tubular or U-shaped sectional metal arms with sections of different diameters, disposed and adapted to telescope into each other and being provided with bolt-holes whereby the sections may be held together in various stationary positions by bolts therethrough.

4. A combination as described in claim 3, in which the single-action hydraulic cylinder and the expansion spring are eliminated and a double-action hydraulic cylinder, attached by means to and situated between, the two metal arms, in the same relative position as the expansion spring was theretofore situated, is substituted therefor.

5. A combination as described in claim 4, in which the corrugated metal plates removably attached to the ends of the arms, are of square, oblong or any other required shape.

* * * * *